2,784,238

CATALYST REACTIVATION IN PROCESS FOR PRODUCTION OF RESORCINOLS

David Ian Hutchinson Jacobs, Upper Pine, Woodmansterne, England, assignor, by mesne assignments, to Hercules Powder Company, a corporation of Delaware No Drawing. Application February 16, 1954,
Serial No. 410,699

Claims priority, application Great Britain
February 21, 1953

15 Claims. (Cl. 260—621)

The present invention relates to an improvement in the manufacture of dihydric phenols, and in particular to that of resorcinol from m-di-isopropylbenzene dihydroperoxide.

The production of phenols by the catalytic decomposition of di-alkyl aryl methyl hydroperoxides has already been described. According to one process the reaction is carried out under substantially anhydrous conditions in the presence of an inert organic solvent, using a solid heterogeneous catalyst, for example fuller's earth. The phenols may be separated from the resulting reaction mixtures by solvent extraction and distillation methods.

Hitheto, it has not been possible to reach a high economic efficiency when applying this process to the production of resorcinol from m-di-isopropylbenzene dihydroperoxides owing to the high consumption of the expensive solid catalysts. This is due to the inactivation of the catalysts during the reaction, apparently as the result of the deposition of a dark reddish-brown resin, and it has not been previously possible to restore the activity of such inactivated catalysts. It has now been found that, by carrying out the reaction in the presence of specific solvents, the activity of the catalyst, although it may decrease with continued use, may be restored by treatment with a polar oxygenated organic solvent.

Accordingly, the present invention for the production of resorcinol comprises catalytically decomposing in the substantially anhydrous liquid phase m-di-isopropylbenzene dihydroperoxide in solution in a liquid aromatic hydrocarbon or liquid chlorinated aromatic hydrocarbon solvent or mixtures thereof, using a solid catalyst as hereinafter defined, separating the catalyst from the reaction mixture and reactivating the separated catalyst with a polar oxygenated organic solvent.

The m-di-isopropylbenzene dihydroperoxide used as starting material in the invention may be either in the form of the isolated dihydroperoxide, or in the form of a crude reaction mixture containing the dihydroperoxide, obtained for instance by the oxidation of m-di-isopropylbenzene. When the dihydroperoxide is obtained by such an oxidation, the oxidation is usually interrupted before all of the di-isopropylbenzene has reacted in order to avoid or limit side-reactions. The dihydroperoxide is then obtained in admixture with m-di-isopropylbenzene and its monohydroperoxide, together with secondary reaction products, such as the corresponding alcohols, in small amounts. If it is desired, however, to use as starting material the isolated dihydroperoxide, the reaction mixture obtained as above may be fractionally distilled under reduced pressure, or may be extracted with, for instance, dilute caustic soda, to recover the dihydroperoxide.

The solvents which may be used for the decomposition reaction in the present invention include aromatic hydrocarbons such as benzene, toluene, or xylene, and chlorinated aromatic hydrocarbons, for instance chlorobenzene and α-chloronaphthalene, or mixtures of such compounds. Solvents such as β-chloronaphthalene, which are solid at room temperature, may also be used, the decomposition reaction being carried out at a temperature at which the solvent exists in the liquid state. It has been found that particularly satisfactory results are obtained by the use of benzene as the reaction solvent. The use of polar solvents such as acetone, even admixed with benzene in a proportion of 2:1, while giving initially high yields of resorcinol, causes irreversible inactivation of the catalyst. The acetone formed from the dihydroperoxide during the course of the reaction as carried out in the process of the present invention does not, however, reach a sufficiently high concentration to have this effect on the catalyst.

The solid catalysts which may be used in the present invention are the acidic surface active clay catalysts known as montmorillonites, bentonites, fuller's earths, vermiculites, attapulgites, kaolinites and illites in their acid-activated and/or heat activated forms. As examples of such acid-activated clays available commercially, may be mentioned Fulmont 500 and FE 237 (fuller's earths), marketed by the Fullers Earth Union Ltd., Redhill, Surrey. Clay catalysts which have been activated by heat-treatment and not by acid treatment include Florex XXF (a fuller's earth) (marketed by the Foridin Company, U. S. A.), Attapulgus 50–248–52C and Attapulgus 50–248–52A (attapulgites) (marketed by the Attapulgus Clay Company U. S. A.). Although the latter catalysts are nominally neutral, they have, in fact, sufficient acidic surface activity to be operative in the acidic decomposition reaction of the present invention.

The proportion of catalyst which may be used relative to the weight of m-di-isopropylbenzene dihydroperoxide, hereinafter referred to as dihydroperoxide, varies within wide limits, and may be as low as 1 part by weight of catalyst to 1,000 parts by weight of dihydroperoxide on the one hand, and as high as 5 parts of catalyst to 1 part of dihydroperoxide on the other hand. Suitable ratios are between 1:10 and 1:100.

The reaction mixture is preferably in a substantially anhydrous condition, since the presence of water inhibits and may completely stop the reaction. The water content of the reaction mixture should, therefore, not be substantially greater than 1%, and if more than that amount of water is formed by the decomposition of the dihydroperoxide it is desirable to arrange for the removal of such water during the course of the reaction. In a preferred embodiment in which the reaction is carried out in a batchwise manner, the reaction solvent and the catalyst are introduced into a vessel having a condenser fitted with a trap to remove the water which appears as a separate phase, and the mixture is stirred and refluxed until no more water separates. The dihydroperoxide dissolved in the reaction solvent is then introduced as rapidly as the vigour of the reaction permits, and the water formed in the course of the reaction is removed in the same way. In addition to effecting the removal of water in a satisfactory manner this method provides a convenient way of controlling the heat of reaction.

The reaction may be carried out at temperatures in the range of about 40° C. to about 100° C., the preferred reaction temperature being about 80° C. At temperatures substantially higher than 100° C. (e. g. 110° C. the boiling point of toluene) irreversible inactivation of the catalyst may take place. Though the reaction is generally carried out at atmospheric pressure, reduced or increased pressures may be used if desired.

The reaction may be carried out in a batchwise or in a continuous manner. In the former case the catalyst and the reaction solvent may be introduced into the reaction vessel first and the dihydroperoxide added gradually as noted above. The reaction is usually terminated when the titration of a sample of the reaction mixture indicates that at least 90% and preferably up to 98% of the added dihydroperoxide has been decomposed. The reaction may then be allowed to cool, filtered, and the catalyst washed with a little fresh reaction solvent. Before use in the next batch, the catalyst is preferably treated to remove adsorbed water, for example, by refluxing with reaction solvent as described above.

The time required for the decomposition of up to 90 to 98% of the added dihydroperoxide will vary according to the activity of the catalyst. It has been found that with for instance, fresh fuller's earth catalyst the activity of the catalyst is initially high, but falls with each successive use of the catalyst. At the same time the yield of resorcinol obtained is initially low, for example 65%, but increases with continued use of the catalyst to a high value, for example 90%. The stage at which it is economically expedient to reactivate the catalyst can be readily determined by experiment and calculation, but it has been found advantageous to reactivate after the catalyst has been used for the decomposition of three or four batches of dihydroperoxide.

When the reaction is carried out in a continuous manner, one embodiment consists in supplying the fresh catalyst in admixture with reaction solvent counter-currently to the dihydroperoxide. Part of the reaction mixture and catalyst is continually withdrawn and the catalyst is filtered off and reactivated before being returned to the reaction zone in admixture with fresh solvent. The reaction product after removal of the catalyst is treated for the removal of resorcinol, and is then recycled to the reactor after being supplemented with fresh dihydroperoxide. Alternatively, a concurrent process may be used, the reaction solvent, catalyst, and dihydroperoxide being fed at one end of the reactor, and the reaction product and catalyst being removed at the other end and treated for recovery of resorcinol and reactivation of the catalyst.

The reactivation of the catalyst, whether a batchwise or continuous process for the decomposition reaction is being used, is carried out by treating it with a polar oxygenated organic solvent such as a lower aliphatic alcohol or ketone, esters of such alcohols with lower aliphatic acids, or an ether of low molecular weight, such as, for example lower aliphatic ethers, or with mixtures of these compounds. Exemplary of these are methanol, ethanol, propanol, cyclohexanol, acetone, methyl ethyl ketone, diethyl ketone, cyclohexanone, methyl acetate, ethyl acetate, butyl acetate, diethyl ether, ethyl methyl ether, dipropyl ether, dibutyl ether, dioxane or mixtures of any of these compounds. Preferred solvents include ethanol, acetone, ethyl acetate and diethyl ether. The treatment may be carried out by washing the catalyst with the reactivating agent for about five minutes, or by refluxing the catalyst with the reactivating agent for a short time. The latter method has the advantage that more catalyst can be reactivated per volume of reactivating agent. The catalyst is then filtered and washed, first with the reactivating agent, and subsequently with the reaction solvent. It is then ready for re-use in the reaction zone. The reactivation may be repeated when the activity of the catalyst has again fallen off.

The following examples indicate the way in which the process may be carried out in practice:

Example 1

91 parts by weight of benzene and as catalyst 1.5 parts by weight of a fuller's earth, marketed under the name Fulmont 500 by the Fuller's Earth Union Ltd. were introduced into a vessel fitted with a stirrer and a reflux condenser having a trap to remove separated water from the condensate. The suspension was stirred and refluxed until no more water separated. 15 parts by weight of m-di-isopropylbenzene dihydroperoxide were then added in the form of a 33.3% wt./vol. solution in benzene, as rapidly as the vigour of the reaction permitted. The reaction temperature was maintained at between 78 and 80° C. Stirring and refluxing were continued until titration of a sample of the reaction mixture indicated that 98% of the added dihydroperoxide had been decomposed. The reaction mixture was allowed to cool, filtered, and the catalyst washed with a little fresh benzene. The same catalyst was used to decompose three further batches of dihydroperoxide as above, and was then reactivated by refluxing with acetone for five minutes, followed by filtration and washing, first with acetone and then with benzene. The catalyst was then used to decompose a fifth batch of dihydroperoxide. The results detailed below illustrate the gradual inactivation of the catalyst during the first four batches, and the restoration of its activity in the decomposition of the fifth batch of dihydroperoxide.

| Batch Number | Activity of Catalyst, Time for 98% reaction in mins. | Yield percent of resorcinol |
| --- | --- | --- |
| 1 | Less than 10 | 73 |
| 2 | 55 | 84 |
| 3 | 115 | 83 |
| 4 | 200 | 90 |
| | Catalyst reactivated | |
| 5 | Less than 10 | 88 |

Example 2

The decomposition of m-di-isopropylbenzene dihydroperoxide was carried out as in Example 1 using as catalyst a fuller's earth grade FE 237 marketed by the Fuller's Earth Union Ltd. 12 batches of dihydroperoxide were decomposed, the catalyst being reactivated with acetone after the fifth and eleventh batches. The results were as follows:

| Batch Number | Activity of Catalyst, Time for 98% reaction in mins. | Yield percent of resorcinol |
| --- | --- | --- |
| 1 | 5 | 65 |
| 2 | 10 | 83 |
| 3 | 30 | 82 |
| 4 | 40 | 78 |
| 5 | 40 | 79 |
| | Catalyst reactivated | |
| 6 | less than 5 | 76 |
| 7 | 25 | 86 |
| 8 | 30 | 86 |
| 9 | 30 | 79 |
| 10 | 35 | 83 |
| 11 | 80 | 90 |
| | Catalyst reactivated | |
| 12 | 15 | 89 |

Example 3

A sample of dihydroperoxide was treated under identical conditions with those of Example 2, the catalyst being reactivated after the third batch. On decomposition of the fourth batch of dihydroperoxide the activity of the catalyst was seen to be restored to its initial value. By way of comparison another sample of dihydroperoxide was decomposed under identical conditions, except that the water formed during the course of the reaction was not removed in the condenser by decantation but was allowed to reflux with the reaction mixture. The catalyst was again reactivated with acetone after the third batch of dihydroperoxide had been decomposed. The results, tabulated below, show that under these conditions inactivation of the catalyst takes place much more rapidly, but that the activity is fully restored by the acetone treatment.

| Batch number | Water removed during reaction | | Water allowed to reflux with reaction mixture | |
|---|---|---|---|---|
| | Activity, mins. (As in Example 2) | Percent yield | Activity, mins. (As in Example 2) | Percent yield |
| 1 | Less than 10 | 73 | Less than 10 | 70 |
| 2 | do | 83 | 30 | 77 |
| 3 | 20 | 83 | 160 | 64 |
| | Catalyst reactivated | | | |
| 4 | Less than 10 | 79 | 10 | 79 |

*Example 4*

The following example illustrates the use of reactivating agents other than acetone. Three experiments were carried out using conditions identical with those of Example 2. After decomposition of the third batch of dihydroperoxide in each case, the three catalysts were refluxed with ether, ethanol, and chloroform respectively. The results show that while the activity of the catalyst is fully restored by ether and ethanol, chloroform is ineffective in this respect.

| Batch Number | I | | II | | III | |
|---|---|---|---|---|---|---|
| | Activity, mins. (As in Example 2) | Percent yield | Activity, mins. (As in Example 2) | Percent yield | Activity, mins. (As in Example 2) | Percent yield |
| 1 | Less than 10. | 64 | Less than 10. | 68 | 10 | 63 |
| 2 | 20 | 63 | 20 | 75 | 20 | 75 |
| 3 | 40 | 65 | 40 | 70 | 40 | 71 |
| Activating agent. | Ether, 10 | 71 | Ethanol, Less than 10. | 65 | Chloroform, 40. | 86 |

*Example 5*

Under conditions otherwise identical with Example 2, a sample of dihydroperoxide was decomposed using toluene as the reaction solvent. The reaction was carried out under reduced pressure to maintain the reaction mixture at a temperature of 78° to 80° C. After decomposition of the third batch of dihydroperoxide the catalyst was reactivated with acetone. The results are tabulated below:

| Batch Number | Activity, mins. (As in Example 2) | Percent, yield |
|---|---|---|
| 1 | Less than 10 | 66 |
| 2 | 40 | 81 |
| 3 | 80 | 67 |
| | Catalyst reactivated | |
| 4 | Less than 10 | 77 |

By way of comparison another sample of dihydroperoxide was decomposed under identical conditions except that the reaction temperature was allowed to rise to approximately 110° C., by the use of atmospheric pressures. The catalyst was treated with acetone after the decomposition of two batches of dihydroperoxide, and then used to decompose a third batch. The results tabulated below show that too high a reaction temperature leads to quick inactivation of the catalyst, and that this inactivation cannot be reversed.

| Batch Number | Activity, mins. (As in Example 2) | Percent yield |
|---|---|---|
| 1 | 10 | 51 |
| 2 | 160 | 63 |
| | Catalyst reactivated | |
| 3 | 80 | 68 |

*Example 6*

91 parts by weight of benzene and as catalyst 1.5 parts by weight of a neutral solid catalyst marketed under the name of Florex XXF by the Floridin Co., U. S. A., were introduced into a vessel fitted with a stirrer and a reflux condenser having a trap to remove separated water from the condensate. The suspension was stirred and refluxed until no more water separated. 15 parts by weight of m-di-isopropylbenzene dihydroperoxide were then added in the form of a 33.3% wt./vol. solution in benzene, as rapidly as the vigour of the reaction permitted. The reaction temperature was maintained at between 78 and 80° C. Stirring and refluxing were continued until titration of a sample of the reaction mixture indicated that 98% of the added dihydroperoxide had been decomposed. The reaction mixture was allowed to cool, filtered, and the catalyst washed with a little fresh benzene. The same catalyst was used to decompose two further batches of dihydroperoxide as above, and was then reactivated by refluxing with acetone for five minutes, followed by filtration and washing, first with acetone and then with benzene. The catalyst was then used to decompose a fourth batch of dihydroperoxide. The results detailed below illustrate the gradual inactivation of the catalyst during the first three batches, and the restoration of its activity in the decomposition of the fourth batch of dihydroperoxide.

| Batch Number | Activity of Catalyst, Time for 98 percent reaction in mins. | Yield percent of resorcinol |
|---|---|---|
| 1 | 20 | 71 |
| 2 | 20 | 76 |
| 3 | 40 | 77 |
| | Catalyst reactivated | |
| 4 | 20 | 75 |

*Example 7*

The process of Example 6 was repeated using a neutral solid catalyst marketed under the name of Attapulgus 50-248-52 C by the Attapulgus Clay Company, U. S. A. The catalyst was used to decompose four batches of dihydroperoxide the activity of the catalyst falling off considerably in the third and fourth batches. After refluxing the catalyst with acetone for five minutes, a fifth batch of dihydroperoxide was decomposed, when the activity was shown to be completely restored. The results were as follows:

| Batch Number | Activity of Catalyst, Time for 98 percent reaction in mins. | Yield percent of resorcinol |
|---|---|---|
| 1 | Less than 20 | 77 |
| 2 | More than 20 | 81 |
| 3 | 40 | 76 |
| 4 | 80 | 70 |
| | Catalyst reactivated | |
| 5 | 20 | 75 |

*Example 8*

The process of Example 6 was repeated using a neutral solid catalyst marketed under the name of Attapulgus 50-248-52 A by the Attapulgus Clay Company, U. S. A. The catalyst was used to decompose four batches of dihydroperoxide, being reactivated with acetone after the third batch.

| Batch number | Activity of Catalyst, Time for 98 percent reaction in mins. | Yield percent of resorcinol |
| --- | --- | --- |
| 1 | 20 | 73. |
| 2 | 20 | 76. |
| 3 | 80 | 74. |
|  | Catalyst reactivated |  |
| 4 | 40 | Not determined. |

I claim:

1. In the process for the production of resorcinol by catalytically decomposing m-diisopropylbenzene dihydroperoxide in a solvent selected from the group consisting of liquid aromatic hydrocarbons, liquid chlorinated aromatic hydrocarbons and mixtures thereof by contacting the solution of the dihydroperoxide with an acidic surface active clay catalyst under substantially anhydrous conditions to form a decomposition reaction mixture containing resorcinol in solution and resins adsorbed on the catalyst, and the catalyst is separated and reused, the improvement whereby the catalyst is revivified prior to reuse which comprises contacting the used catalyst with a liquid volatile reactivation solvent consisting of a polar oxygenated organic solvent until said resins adsorbed on the catalyst are dissolved, and separating the catalyst therefrom in activated condition for reuse, said polar oxygenated organic solvent being selected from the group consisting of lower aliphatic alcohols, lower aliphatic ketones, esters of lower aliphatic alcohols and lower aliphatic acids, and lower aliphatic ethers.

2. The process, as in claim 1, wherein the temperature during the decomposition reaction is between about 40° and about 100° C.

3. The process, as in claim 1, wherein the acidic surface active clay catalyst is an acid-activated fuller's earth.

4. The process as in claim 1, wherein the acidic surface active clay catalyst is a heat-treated attapulgite.

5. The process, as in claim 1, wherein the acidic surface active clay catalyst is a heat-treated fuller's earth.

6. The process, as in claim 1, wherein the solvent for the dihydroperoxide is benzene.

7. The process, as in claim 1, wherein the solvent for the dihydroperoxide is toluene.

8. The process, as in claim 1, wherein the solvent for the dihydroperoxide is xylene.

9. The process, as in claim 1, wherein the solvent for the dihydroperoxide is chlorobenzene.

10. The process, as in claim 1, wherein the solvent for the dihydroperoxide is α-chloronaphthalene.

11. The process, as in claim 1, wherein the polar oxygenated organic solvent is ethanol.

12. The process, as in claim 1, wherein the polar oxygenated organic solvent is acetone.

13. The process, as in claim 1, wherein the polar oxygenated organic solvent is ethyl acetate.

14. The process, as in claim 1, wherein the polar oxygenated organic solvent is diethyl ether.

15. The process, as in claim 1, wherein the catalyst is reactivated by refluxing with the polar oxygenated organic solvent, filtering off the catalyst, and washing the catalyst first with the polar oxygenated organic solvent and subsequently with the solvent for the dihydroperoxide.

References Cited in the file of this patent

UNITED STATES PATENTS

| | | |
| --- | --- | --- |
| 1,558,163 | Hall | Oct. 20, 1925 |
| 1,933,508 | Peck | Oct. 31, 1933 |
| 2,457,556 | Heinemann et al. | Dec. 28, 1948 |

FOREIGN PATENTS

| | | |
| --- | --- | --- |
| 968,209 | France | Apr. 12, 1950 |
| 979,665 | France | Dec. 13, 1950 |
| 485,435 | Canada | Aug. 5, 1952 |
| 676,770 | Great Britain | Aug. 6, 1952 |
| 676,771 | Great Britain | Aug. 6, 1952 |